Sept. 18, 1956    C. P. WEST ET AL    2,763,710

ELECTRICAL BUS WITH SUPPORT AND HOUSING STRUCTURE

Filed March 8, 1952    3 Sheets-Sheet 1

WITNESSES:

E. A. McCloskey.

Wm. B. Sellers.

INVENTORS
Charles P. West
and Harold H. Rugg.
BY [signature]
ATTORNEY

Sept. 18, 1956 C. P. WEST ET AL 2,763,710

ELECTRICAL BUS WITH SUPPORT AND HOUSING STRUCTURE

Filed March 8, 1952

3 Sheets-Sheet 2

INVENTORS
Charles P. West
and Harold H. Rugg.
BY [signature]
ATTORNEY

Sept. 18, 1956 C. P. WEST ET AL 2,763,710

ELECTRICAL BUS WITH SUPPORT AND HOUSING STRUCTURE

Filed March 8, 1952 3 Sheets-Sheet 3

WITNESSES:
E. A. McCloskey.
Wm. B. Sellers

INVENTORS
Charles P. West
and Harold H. Rugg.
BY [signature]
ATTORNEY

United States Patent Office 2,763,710

Patented Sept. 18, 1956

2,763,710

ELECTRICAL BUS WITH SUPPORT AND HOUSING STRUCTURE

Charles P. West, Forest Hills, and Harold H. Rugg, Pittsburgh, Pa., assignors to Westinghouse Electric Corporation, East Pittsburgh, Pa., a corporation of Pennsylvania Application March 8, 1952, Serial No. 275,611

13 Claims. (Cl. 174—99)

Our invention relates, generally, to electrical bus structures and, more particularly to metal-enclosed, isolated-phase bus structures of the type disclosed in U. S. Patent No. 2,531,017, issued November 21, 1950, to C. P. West, H. H. Rugg and P. R. Pierson, and assigned to the same assignee as this application.

As described in the aforesaid patent, an electrical conductor is mounted in a metal trough which is slightly more than semicircular in cross section and may be built in sections of predetermined lengths. The trough is supported by supporting members welded to the trough and having feet for attachment to a supporting structure. The conductor is supported by pairs of oppositely disposed insulators mounted in the trough at predetermined intervals. A removable cover is provided for each section of trough to complete the enclosure.

An object of our invention is to provide a simplified and improved means for supporting the conductor in the enclosure.

A more specific object of our invention is to so support the conductor in the enclosure that no tension forces are applied to the supporting insulators even when there are large magnetic forces applied to the conductor in a lateral direction due to short circuit currents flowing in a plurality of adjacent conductors.

Another object of our invention is to provide for longitudinal expansion and contraction of the conductor in its supports because of temperature changes.

A further object of our invention is to provide for anchoring each length of conductor to a support.

Other objects of our invention will be explained fully hereinafter or will be apparent to those skilled in the art.

In accordance with one embodiment of our invention, each length of bus conductor comprises two channel sections which are disposed to form a hollow square and are supported by oppositely disposed insulators mounted with their axes in line with the short circuit forces which exist between parallel adjacent conductors. The channel sections are tied together and spaced apart by bus spacers disposed at predetermined intervals. The edges of the channels are disposed in retainers which are so attached to the insulators that the channels are free to slide longitudinally when necessary because of temperature changes. Locking plates may be provided on one set of supports for each length of conductor to anchor the conductor longitudinally.

For a better understanding of the nature and objects of the invention, reference may be had to the following detailed description, taken in conjunction with the accompanying drawings, in which.

Figure 1:
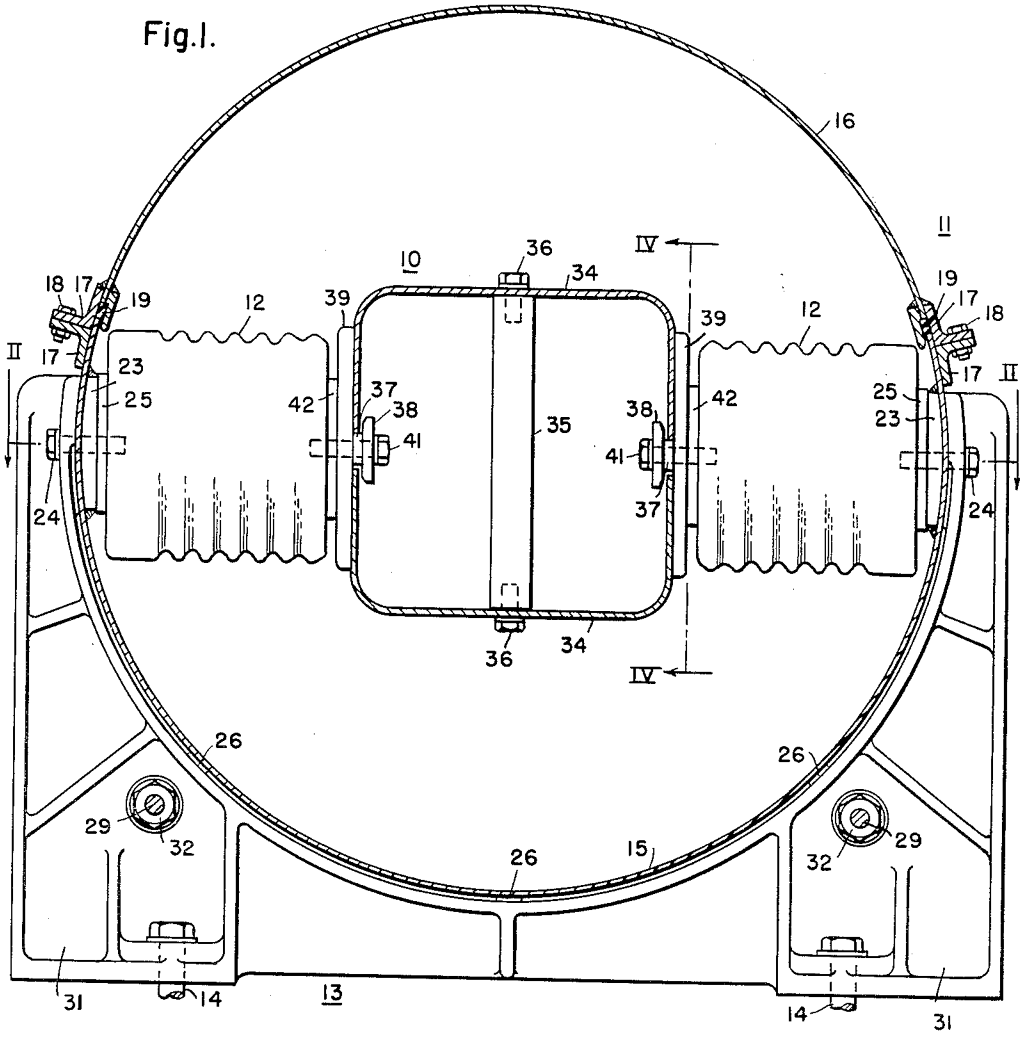
Figure 1 is a view, partly in section and partly in end elevation, of one phase of a bus structure embodying the principal features of the invention, the section being taken along the line I—I in Figure 3.
Figure 2:
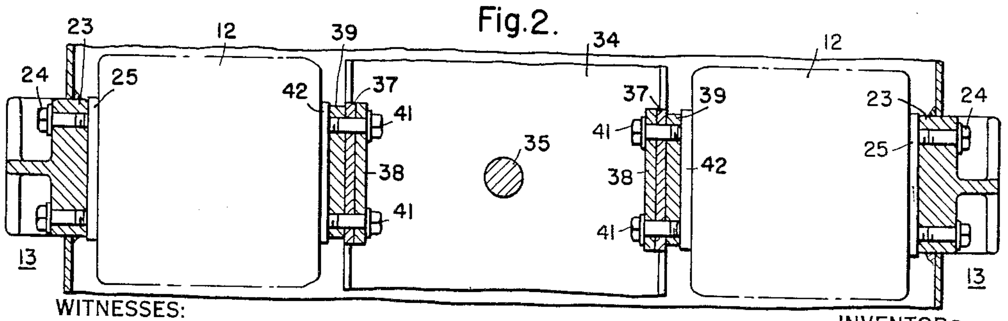
Figure 2 is a view, in section, taken along the line II—II in Figure 1.

Referring to the drawings, and particularly to Fig. 1, the structure shown therein comprises a bus conductor 10, a housing 11 for enclosing the conductor 10, oppositely disposed insulators 12 which are mounted in the housing 11 to support the conductor, and a supporting member 13 which may be attached to a suitable supporting structure (not shown) by means of bolts 14. As described in the aforesaid Patent 2,531,017, the housing 11 comprises a trough 15 which is slightly greater than a semicircle in cross section and a cover 16 which is removably attached to the trough 15 by clamp members 17 which may be drawn together by means of bolts 18.

Figure 3:
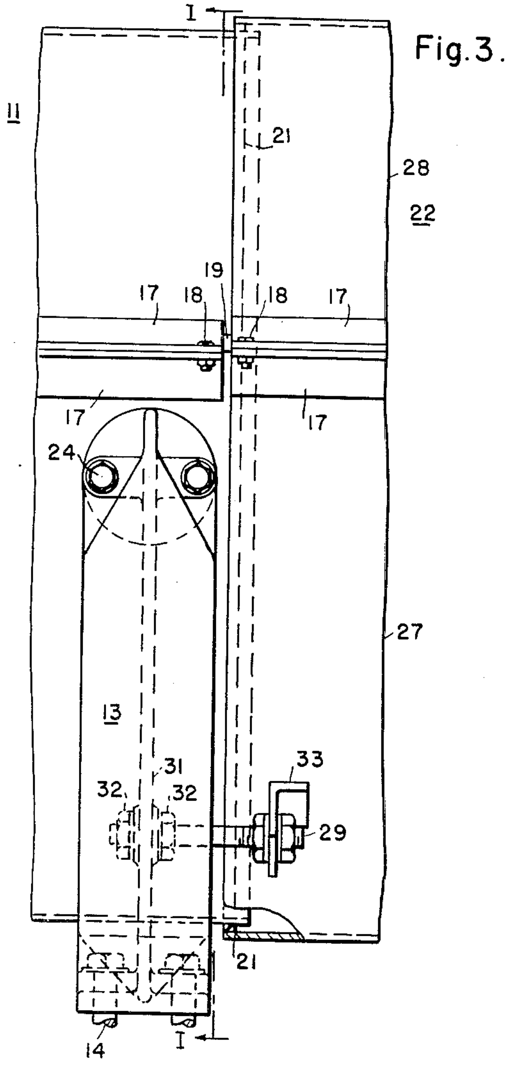
Figure 3 is a view, in side elevation, of a portion of the bus structure.
Figure 4:
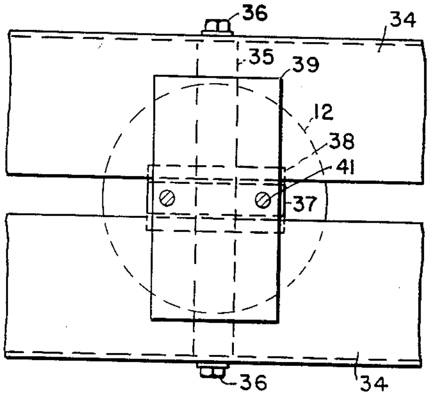
Figure 4 is a view, partly in section and partly in elevation, taken along the line IV—IV in Figure 1.

As described in a co-pending application of H. H. Rugg Serial No. 275,612, filed March 8, 1952, a straight gasket 19 is provided between the edges of the trough 15 and the cover 16. As shown in Fig. 3, a circular gasket 21 is provided between an additional housing section 22 and the housing 11. The end of the housing section 22 overlaps the end of the housing section 11. As described in the aforesaid co-pending application, the circular gasket 21 overlaps the straight gaskets 19, thereby tightly sealing all joints in the housing.

As also described in the aforesaid co-pending application, each insulator 12 is rigidly attached to a boss 23 which is formed integrally with the supporting member 13 and projects through an opening in the trough 15. The insulator is attached to the boss by means of bolts 24 which are threaded into an insert 25 in the insulator 12. The trough 15 is welded to the boss 23 around the opening in the trough, thereby securing the trough to the supporting member 13.

As shown, the trough 15 is spaced slightly from the bore of the supporting member 13. The trough may be welded to the bore of the supporting member 13 at several points 26, thereby stiffening the trough. The supporting members 13 may be provided at predetermined locations along the bus structure as shown in Fig. 7.

Figure 7:
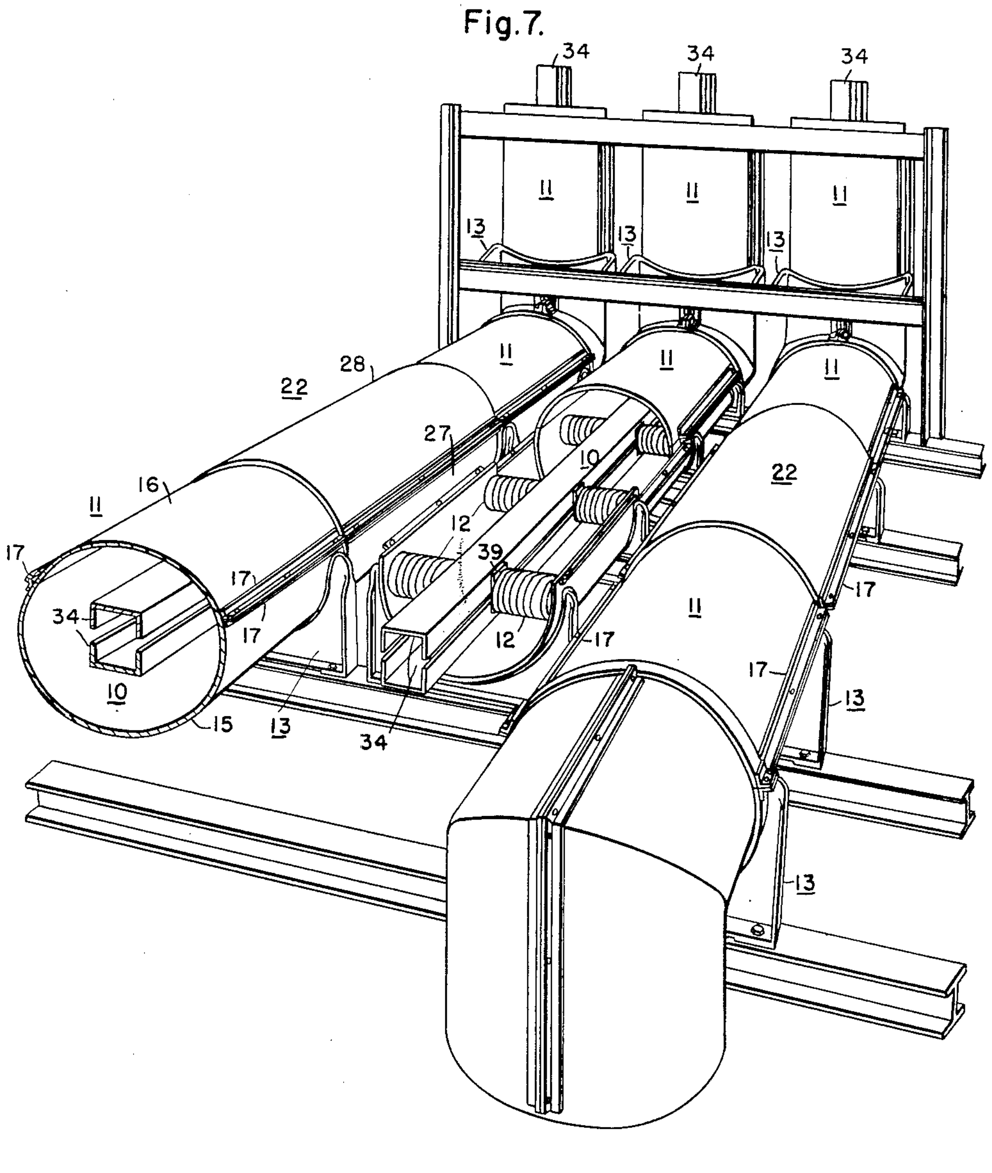
Figure 7 is a view, in perspective, of a portion of a typical three-phase bus structure constructed in accordance with the invention.

As also shown in Fig. 7, removable housing sections 22 may be provided between housing sections 11 in each phase of a three-phase structure. The sections 22 may be of different lengths, thereby facilitating the construction and installation of the bus structure. Each housing section 22 overlaps the ends of the housing sections 11 which it connects and comprises a trough portion 27 and a cover portion 28. The cover 28 is attached to the trough 27 by means of clamp members 17 and bolts 18 in the same manner as the cover 16 is attached to the trough 15. As shown in Fig. 7, a length of bus conductor 10 may extend through several housing sections, depending upon installation conditions.

The trough 27 may be connected to a supporting member 13 by means of a grounding bolt 29. One end of the bolt 29 is connected to a web 31 of the supporting member 13 by means of nuts 32. The other end of the bolt 29 is connected to a bracket 33 which is attached to the trough 27. The bolt 29 grounds the trough 27 through the supporting member 13 which, as previously explained, is attached to a supporting structure. The bolt 29 also functions to prevent longitudinal movement of the housing section 22.

As explained hereinbefore, it is essential that the bus conductor 10 be so mounted between the diametrically opposed insulators 12 that no tension forces are applied to the insulators 12 when lateral forces are applied to the conductor 10 because of short circuit currents. It is also essential that the conductor 10 be permitted to expand and contract longitudinally because of temperature changes.

As shown, the conductor 10 comprises two channel shaped members 34 which are disposed in spaced relation to form substantially a hollow square. The channel members 34 are retained in spaced relation by spacing members 35 which may be disposed at predetermined intervals along the conductor 10. The webs of the channel members 34 may be attached to the spacing members 35 by bolts 36 which are threaded into the spacing members 35.

Supporting members 37 are disposed between adjacent edges of the flanges of the channel members 34. A retaining member 38 is disposed inside each supporting member 37, and a reinforcing plate 39 is disposed outside each supporting member 37. The retaining member 38, the supporting member 37 and the reinforcing plate 39 are all attached to the insulator 12 by means of stud bolts 41 which are threaded into an insert 42 in the insulator 12.

As shown, the thickness of the supporting member 37 is slightly greater than the thickness of the flanges of the channels 34, thereby providing a space between the retainer 38 and the flanges of the channels 34. Also, the width of the supporting member 37 is slightly less than the distance between the opposed edges of the channels 34. Thus, the upper channel 34 merely rests on the top edges of supporting members 37 and the lower channel 34 is suspended from the upper channel by the connecting spacers 35. While the spacers 35 act as tension members when no current is flowing, they act as compression members when heavy currents are flowing, since the current flow in the same direction in both channels 34 creates magnetic forces which act to pull the two channels together.

Since the retainers and the supporting members which are attached to an insulator at one side of the bus are entirely separate from and function independently of the retainers and supporting members attached to the oppositely disposed insulator at the other side of the bus and since a space is provided between the retainers 38 and the sides of the channels, the insulator and the bus supporting members at one side may move laterally without imposing a tension stress on the insulator at the other side of the bus. Thus, only compression forces are applied to the insulators as a result of short circuit stresses. Also, the bus is free to expand and contract longitudinally because of the space provided between the supporting members 37 and the edge of the channels 34.

The reinforcing plates 39 function to prevent bending of the channels 34 by a laterally imposed force. The reinforcing plates 39 may be omitted for channel members of a smaller size when the inserts 42 in the insulator 12 are of substantially the same width as the flanges of the conductor 10. In this case the inserts 42 will function in the same manner as the reinforcing plates 39 to prevent bending of the channels 34.

In order to prevent the bus conductor 10 from shifting longitudinally in the housing, each length of conductor 10 may be anchored to one set of supporting insulators 12, preferably a set located near the middle of the length of conductor, thereby permitting expansion in both directions from the middle. Thus, each length of conductor is anchored to only one housing section and not to each housing section through which it extends.

Figure 5:
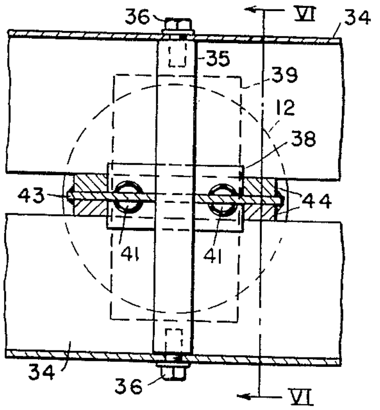
Figure 5 is a view, similar to Figure 4, showing the means provided for anchoring the conductor to a pair of supports.
Figure 6:
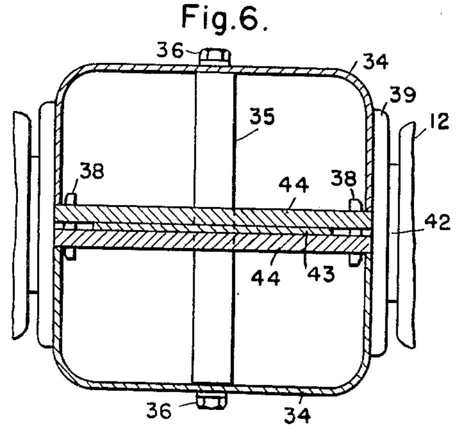
Figure 6 is a view, in section, taken along the line VI—VI in Figure 5.

As shown in Figs. 5 and 6, an anchor plate 43 is disposed between and welded to oppositely disposed pairs of anchor bars 44. The anchor plate 43 has an opening therein for the spacing member 35. The anchor bars 44 are disposed between the edges of the flanges of channels 34 and extend past the ends of the retaining members 38.

Thus, the anchor bars 44 engage the opposite ends of the retaining members 38 to prevent longitudinal movement of the channels 34 in either direction. The channels 34 are prevented from moving by the spacing member 35 to which they are attached and which, as previously explained, extends through an opening in the anchor plate 43 which is welded to the anchor bars 44.

If it is desired to prevent longitudinal movement in one direction only, one set of anchor bars may be omitted, depending upon which direction of movement it is desired to prevent. In this manner the bus is still free to expand and contract longitudinally since each length of bus conductor is anchored to only one set of insulators; furthermore, the bus may move laterally without imposing a tension stress on either insulator since the anchor bars 44 are not connected to the retainer members 38 but merely engage the ends of the retainer members. The structure may be assembled by bolting the insulators 12 to the bosses 23 by means of the bolts 24. The mounting arrangement permits the use of standard insulators of the post type and the bus conductor may be readily assembled in the supporting structure. The support bars 37, the retainer bars 38 and the anchor plates 39 may be bolted to the insulators 12 by means of the bolts 41. The upper channel members 34 may be placed in the grooves between the retainers 38 and the reinforcing plates 39 and the lower channel members 34 attached to the upper channels 34 by means of the spacing members 35 and the bolts 36. The cover 16 may then be attached to the trough 15.

From the foregoing description it is apparent that we have provided for so mounting a bus conductor in a supporting structure that the conductor is free to slide through the supports when necessary because of temperature changes but is prevented from shifting longitudinally in the supporting structure. Furthermore, the conductor is so mounted between oppositely disposed insulators that only compression forces are applied to the insulators as a result of stresses caused by short circuit currents in the conductor.

Since certain changes may be made in the above-described construction and different embodiments of the invention may be made without departing from the spirit and scope thereof, it is intended that all the matter contained in the foregoing description or shown in the accompanying drawings shall be considered as illustrative and not in a limiting sense.

We claim as our invention:

1. In a bus structure, in combination, a conductor comprising two oppositely disposed channel-shaped members, a spacing member disposed between and attached to the webs of the channel members, a housing for the conductor, insulators rigidly mounted in the housing on opposite sides of the conductor, a supporting member attached to each insulator, each supporting member being attached to one of said insulators and supported solely by said one insulator, said supporting members being disposed between the edges of the flanges of the channel members to slidably support the conductor, and a retaining portion associated with each supporting member to retain the conductor on the supporting member, said supporting member extending a short distance beyond the edges of the flanges of the channel members, thereby spacing said retaining portion from said flanges, each retaining portion overlapping the inside of the flanges of the channels between which its associated supporting member is disposed.

2. In a bus structure, in combination, a conductor comprising two oppositely disposed channel-shaped members, a spacing member disposed between the webs of the channel members, a housing for the conductor, insulators rigidly mounted in the housing on opposite sides of the conductor, a supporting member attached to each insulator, each supporting member being attached to one of said insulators and supported solely by said one insulator, said supporting members being disposed between the edges of the flanges of the channel members to slidably support the conductor, and a retaining portion associated with each supporting member to retain the conductor on the supporting member, each retaining portion being spaced from and overlapping the inside of the flanges of the channels between which its associated supporting member is disposed, said supporting member extending a short distance beyond the edges of the flanges of the channel members to space the retaining portion from the channel members.

3. In a bus structure, in combination, a conductor comprising two oppositely disposed channel-shaped members, a spacing member disposed between and attached to the webs of the channel members, a housing for the conductor, insulators rigidly mounted in the housing on opposite sides of the conductor, a supporting member attached to each insulator and disposed between the edges of the flanges of the channel members to slidably support the conductor, a retaining member associated with each supporting member to retain the conductor on the supporting member, each retaining member being spaced from and overlapping the inside of the flanges of the channels between which its associated supporting member is disposed, said retaining member being spaced from the channels by the supporting member which extends beyond the flanges of the channels between which it is disposed, and a reinforcing plate disposed between the flanges of the channels and each insulator, said reinforcing plate engaging the outside of the channel flanges to prevent bending the flanges.

4. In a bus structure, in combination, a conductor comprising two oppositely disposed channel-shaped members, a spacing member disposed between and attached to the webs of the channel members, a housing for the conductor, insulators rigidly mounted in the housing on opposite sides of the conductor, a supporting member attached to each insulator and disposed between the edges of the flanges of the channel members to slidably support the conductor, a retaining member associated with each supporting member to retain the conductor on the supporting member, each retaining member being spaced from and overlapping the inside of the flanges of the channels between which its associated supporting member is disposed, said retaining member being spaced from the channels by the supporting member which extends beyond the flanges of the channels between which it is disposed, a reinforcing plate disposed between the flanges of the channels and each insulator, said reinforcing plate engaging the outside of the channel flanges to prevent bending the flanges and threaded means extending through the associated retaining member and supporting member and reinforcing plate for each insulator into the insulator to attach said members to the insulator.

5. In a bus structure in combination, a conductor comprising two channel-shaped members disposed to form substantially a hollow square, a spacing member disposed between and attached to the webs of the channel members, a housing for the conductor, insulating means mounted in the housing on opposite sides of the conductor, generally rectangular supporting members disposed between the edges of the flanges of the channel members, said supporting members having longitudinal and transverse axes, each supporting member being attached to the insulating means at one side only of the conductor, the longitudinal axis of the supporting member being parallel to the conductor and a retaining member associated with each supporting member to retain the conductor on the supporting member, said retaining members being disposed entirely within said hollow square, the supporting member and the retaining member at one side being independent of the supporting member and the retaining member at the other side of the structure.

6. In a bus structure in combination, a conductor comprising two channel-shaped members disposed to form substantially a hollow square, a spacing member disposed between the webs of the channel members, a housing for the conductor, insulating means mounted in the housing on opposite sides of the conductor, generally rectangular supporting members disposed between the edges of the flanges of the channel members, said supporting members having longitudinal and transverse axes, each supporting member being attached to the insulating means at one side only of the conductor, the longitudinal axis of the supporting member being parallel to the conductor, a retaining member associated with each supporting member to retain the conductor on the supporting member, said retaining members being disposed entirely within said hollow square, the supporting member and the retaining member at one side being independent of the supporting member and the retaining member at the other side of the structure, and each retaining member overlapping the flanges of the channels between which its associated supporting member is disposed.

7. In a bus structure, in combination, a conductor comprising two channel-shaped members disposed to form substantially a hollow square, a spacing member disposed between and attached to the webs of the channel members, a housing for the conductor, insulating means mounted in the housing on opposite sides of the conductor, supporting members disposed between the edges of the flanges of the channel members, each supporting member being attached to the insulating means at one side only of the conductor, a retaining member associated with each supporting member in supporting the conductor, said retaining members being disposed entirely within said hollow square, and an anchor member having an opening therein for said spacing member, said anchor member engaging said retaining members to prevent the conductor from moving longitudinally in the housing.

8. In a bus structure, in combination, a conductor comprising two channel-shaped members disposed to form substantially a hollow square, a spacing member disposed between and attached to the webs of the channel members, a housing for the conductor, insulating means mounted in the housing on opposite sides of the conductor, supporting members disposed between the edges of the flanges of the channel members, each supporting member being attached to the insulating means at one side only of the conductor, a retaining member associated with each supporting member in supporting the conductor, said retaining members being disposed entirely within said hollow square, an anchor plate having an opening therein for receiving said spacing member, and anchor bars secured to said plate and engaging said retaining members to prevent longitudinal movement of the conductor in the housing.

9. In a bus structure, in combination, a conductor comprising two channel-shaped members disposed to form substantially a hollow square, a spacing member disposed between and attached to the webs of the channel members, a housing for the conductor, insulating means mounted in the housing on opposite sides of the conductor, supporting members disposed between the edges of the flanges of the channel members, each supporting member being attached to the insulating means at one side only of the conductor, a retaining member associated with each supporting member in supporting the conductor, said retaining members being disposed entirely within said hollow square, an anchor plate disposed within said hollow square, and an anchor bar secured to the anchor plate to cooperate with the spacing member and the retaining members in preventing longitudinal movement of the conductor in the housing.

10. In a bus structure, in combination, a length of conductor comprising two oppositely disposed channel-shaped members, a plurality of spacing members disposed between and attached to the webs of the channel members, a housing for the conductor, a plurality of sets of oppositely disposed insulators mounted in the housing generally rectangular supporting members disposed between the edges of the flanges of the channel members, said supporting members having longitudinal and transverse axes, each supporting member being attached to one of said insulators at one side only of the conductor, the longitudinal axis of the supporting member being parallel to the conductor, and a retaining portion associated with each supporting member to retain the conductor on the supporting member, each retaining portion overlapping the inside of the flanges of the channels between which its associated supporting member is disposed.

11. In a bus structure, in combination, a length of conductor comprising two channel-shaped members disposed to form substantially a hollow square, a plurality of spacing members disposed between and attached to the webs of the channel members, a housing for the conductor, a plurality of sets of oppositely disposed insulators mounted in the housing, supporting members disposed between the edges of the flanges of the channel members, each supporting member being attached to one of said insulators at one side only of the conductor, a retaining member associated with each supporting member in supporting the conductor, said retaining members being disposed entirely within said hollow square, and an anchor member having an opening therein for one of said spacing members, said anchor member engaging the retaining members for one set of insulators to prevent the conductor from shifting longitudinally in the housing.

12. In a bus structure, in combination, a length of conductor comprising two channel-shaped members disposed to form substantially a hollow square, a plurality of spacing members disposed between and attached to the webs of the channel members, a housing for the conductor, a plurality of sets of oppositely disposed insulators mounted in the housing, supporting members disposed between the edges of the flanges of the channel members, each supporting member being attached to one of said insulators at one side only of the conductor, a retaining member associated with each supporting member in supporting the conductor, said retaining members being disposed entirely within said hollow square, an anchor plate having an opening therein for receiving one of said spacing members, and anchor bars secured to said plate and engaging the retaining members for one set of insulators to prevent longitudinal movement of the conductor in the housing.

13. In a bus structure, in combination, a length of conductor comprising two channel-shaped members disposed to form substantially a hollow square, a plurality of spacing members disposed between and attached to the webs of the channel members, a housing for the conductor, a plurality of sets of oppositely disposed insulators mounted in the housing, supporting members disposed between the edges of the flanges of the channel members, each supporting member being attached to one of said insulators at one side only of the conductor, a retaining member associated with each supporting member in supporting the conductor, said retaining members being disposed entirely within said hollow square, an anchor plate disposed within said hollow square, and an anchor bar secured to the anchor plate to cooperate with one of said spacing members and the retaining members for one set of insulators in preventing longitudinal shifting of the conductor in the housing.

References Cited in the file of this patent

UNITED STATES PATENTS

| | | |
|---|---|---|
| 1,915,918 | Bostwick | June 27, 1933 |
| 2,057,273 | Little | Oct. 13, 1936 |
| 2,104,824 | Shoemaker | Jan. 11, 1938 |
| 2,144,247 | Scott | Jan. 17, 1939 |
| 2,303,999 | Huguelet | Dec. 1, 1942 |
| 2,570,885 | Swerdlow | Oct. 9, 1951 |